US008107946B2

(12) United States Patent
Smith

(10) Patent No.: US 8,107,946 B2

(45) Date of Patent: Jan. 31, 2012

(54) SYSTEM AND METHOD FOR USING A WIRED NETWORK TO SEND RESPONSE MESSAGES IN AN AUTOMATION SYSTEM

(75) Inventor: W. Eric Smith, Pleasant Grove, UT (US)

(73) Assignee: Control4 Corporation, Draper, UT (US)

( * ) Notice: Subject to any disclaimer, the term of this patent is extended or adjusted under 35 U.S.C. 154(b) by 940 days.

(21) Appl. No.: 12/036,065

(22) Filed: Feb. 22, 2008

(65) Prior Publication Data

US 2008/0220722 A1 Sep. 11, 2008

Related U.S. Application Data

(60) Provisional application No. 60/891,210, filed on Feb. 22, 2007.

(51) Int. Cl.

| | |
|---|---|
| ***H04M 3/00*** | (2006.01) |
| ***H04M 1/00*** | (2006.01) |
| ***H04B 7/00*** | (2006.01) |
| ***G04B 1/08*** | (2006.01) |

(52) U.S. Cl. .................... 455/420; 455/552.1; 455/41.3; 340/539.15; 340/539.16

(58) Field of Classification Search ................. 455/41.2, 455/41.3, 418, 419, 420, 452.1, 453.1; 340/539.1, 340/539.14, 539.15, 539.16

See application file for complete search history.

(56) References Cited

U.S. PATENT DOCUMENTS

| | | | |
|---|---|---|---|
| 3,878,377 | A | 4/1975 | Brunone |
| 3,909,826 | A | 9/1975 | Schildmeier et al. |
| 4,040,060 | A | 8/1977 | Kaloi |
| 4,068,289 | A | 1/1978 | Ferrigno |
| 4,138,684 | A | 2/1979 | Kerr |
| 4,163,218 | A | 7/1979 | Wu |
| 4,186,381 | A | 1/1980 | Fleischer et al. |
| 4,222,564 | A | 9/1980 | Allen et al. |
| 4,322,842 | A | 3/1982 | Martinez |
| 4,334,171 | A | 6/1982 | Parman et al. |
| 4,393,277 | A | 7/1983 | Besen et al. |
| 4,418,333 | A | 11/1983 | Schwarzbach et al. |
| 4,511,887 | A | 4/1985 | Fiore |
| 4,524,288 | A | 6/1985 | Schimmelpennink et al. |
| 4,527,247 | A | 7/1985 | Kaiser et al. |
| 4,636,791 | A | 1/1987 | Burke et al. |

(Continued)

FOREIGN PATENT DOCUMENTS

| | | |
|---|---|---|
| EP | 0 513 443 | 11/1992 |

(Continued)

OTHER PUBLICATIONS

Depositon of Bill Nuffer, CPP, Apr. 30, 2005, pp. 1-49.

(Continued)

*Primary Examiner* — Christopher M Brandt

(74) *Attorney, Agent, or Firm* — Thorpe North & Western LLP

(57) ABSTRACT

A system and method for sending a response message over a wired communication channel in an automation network is disclosed. The method includes the operation of defining a radio frequency (RF) network between a central controller and a plurality of automation devices. A control signal is transmitted from the central controller to at least one of the plurality of automation devices over the RF network. A response message is sent from at least one of the plurality of automation devices to the central controller using a wired network.

19 Claims, 2 Drawing Sheets

U.S. PATENT DOCUMENTS 4,644,320 A 2/1987 Carr et al.
4,703,306 A 10/1987 Barritt
4,706,274 A 11/1987 Baker et al.
4,755,792 A 7/1988 Pezzolo et al.
4,764,981 A 8/1988 Miyahara et al.
4,768,218 A 8/1988 Yorita
4,823,069 A 4/1989 Callahan et al.
4,825,209 A 4/1989 Sasaki et al.
4,829,554 A 5/1989 Barnes et al.
4,864,588 A 9/1989 Simpson et al.
4,873,711 A 10/1989 Roberts et al.
4,881,259 A 11/1989 Scordato
4,889,999 A 12/1989 Rowen
4,896,370 A 1/1990 Kasparian et al.
4,908,604 A 3/1990 Jacob
4,918,432 A 4/1990 Pauley et al.
4,918,717 A 4/1990 Bissonnette et al.
4,928,778 A 5/1990 Tin
4,939,792 A 7/1990 Urbish et al.
4,940,964 A 7/1990 Dao
4,977,529 A 12/1990 Gregg et al.
4,996,703 A 2/1991 Gray
5,017,837 A 5/1991 Hanna et al.
5,051,720 A 9/1991 Kittirutsunetorn
5,079,559 A 1/1992 Umetsu et al.
5,086,385 A 2/1992 Launey et al.
5,089,974 A 2/1992 Demeyer et al.
5,099,193 A 3/1992 Moseley et al.
5,109,222 A 4/1992 Welty
5,146,153 A 9/1992 Luchaco et al.
5,173,855 A 12/1992 Nielsen et al.
5,191,265 A 3/1993 D"Aleo et al.
5,218,344 A 6/1993 Ricketts
5,218,628 A 6/1993 Ito
5,224,648 A 7/1993 Simon et al.
5,237,264 A 8/1993 Moseley et al.
5,301,353 A * 4/1994 Borras et al. ..................... 455/9
5,321,736 A 6/1994 Beasley
5,348,078 A 9/1994 Dushane et al.
5,359,625 A 10/1994 Vander Mey et al.
5,382,947 A 1/1995 Thaler et al.
5,386,209 A 1/1995 Thomas
5,400,041 A 3/1995 Strickland
5,400,246 A 3/1995 Wilson et al.
5,426,439 A 6/1995 Grossman
5,455,464 A 10/1995 Gosling
5,495,406 A 2/1996 Kushiro et al.
5,530,322 A 6/1996 Ference et al.
5,544,036 A 8/1996 Brown, Jr. et al.
5,565,855 A 10/1996 Knibbe
5,570,085 A 10/1996 Bertsch
5,572,438 A 11/1996 Ehlers et al.
5,574,748 A 11/1996 Vander Mey et al.
5,598,039 A 1/1997 Weber
5,736,965 A 4/1998 Mosebrook et al.
5,793,300 A 8/1998 Suman et al.
5,798,581 A 8/1998 Keagy et al.
5,802,467 A * 9/1998 Salazar et al. ................ 455/420
5,812,531 A * 9/1998 Cheung et al. ................ 370/255
5,905,442 A 5/1999 Mosebrook et al.
5,982,103 A 11/1999 Mosebrook et al.
6,556,660 B1 * 4/2003 Li et al. ...................... 379/15.01
6,687,487 B1 2/2004 Mosebrook et al.
6,803,728 B2 10/2004 Balasubramaniam
6,879,806 B2 * 4/2005 Shorty ......................... 455/11.1
7,012,904 B2 * 3/2006 Taketsugu ..................... 370/329
7,489,668 B2 * 2/2009 Cho et al. ...................... 370/338
2002/0061744 A1 * 5/2002 Hamalainen et al. ......... 455/426
2002/0080774 A1 * 6/2002 Griffith et al. ................ 370/352
2003/0137959 A1 * 7/2003 Nebiker et al. ............... 370/338
2004/0253924 A1 * 12/2004 Acampora ................... 455/41.2
2004/0266350 A1 * 12/2004 Kim ............................ 455/41.2
2005/0086366 A1 * 4/2005 Luebke et al. ................ 709/238
2005/0188050 A1 * 8/2005 Son et al. ...................... 709/208
2005/0286424 A1 * 12/2005 Peeters et al. ................ 370/235
2006/0155984 A1 * 7/2006 Tsuchida et al. .............. 713/156
2006/0194575 A1 * 8/2006 Stadelmeier et al. ...... 455/426.1
2006/0251059 A1 * 11/2006 Otsu et al. ..................... 370/352
2006/0274368 A1 * 12/2006 Imine ........................... 358/1.15
2007/0046493 A1 * 3/2007 Park et al. ................ 340/825.69
2007/0097960 A1 * 5/2007 Kurobe et al. ................ 370/352
2007/0155423 A1 * 7/2007 Carmody et al. .......... 455/556.1
2007/0165787 A1 * 7/2007 Kim et al. .................... 379/1.01
2007/0291707 A1 * 12/2007 Fischer et al. ................ 370/338
2007/0299956 A1 * 12/2007 Odaka et al. .................. 709/223
2008/0130572 A1 * 6/2008 Zhang et al. .................. 370/331
2008/0181172 A1 * 7/2008 Angelhag et al. ............. 370/328
2008/0186881 A1 * 8/2008 Ahl et al. ...................... 370/310
2008/0272934 A1 * 11/2008 Wang et al. .............. 340/870.11

FOREIGN PATENT DOCUMENTS

EP 0 513 688 11/1992

OTHER PUBLICATIONS

Anova Control Center , Operators Manual, pp. 1-50.

* cited by examiner

SYSTEM AND METHOD FOR USING A WIRED NETWORK TO SEND RESPONSE MESSAGES IN AN AUTOMATION SYSTEM

CROSS-REFERENCE TO RELATED APPLICATIONS AND CLAIM OF PRIORITY

Priority of U.S. Provisional patent application Ser. No. 60/891,210 filed on Feb. 22, 2007 is claimed.

FIELD OF THE INVENTION

The present invention relates generally to control of electronic devices.

BACKGROUND

The price of electronic devices has continued to decrease dramatically. In addition, the variety of consumer electronic components and home automation electronics that can be purchased has also continued to increase. For example, digital video recorders, DVD players, large screen TVs, multi-carousel CD players, MP3 players, new video games consoles and similar consumer electronic items have continued to drop in price and become more widely available. Other brief examples of home electronics that are available include: remotely controlled light switches and dimmers, wireless networks, wireless power controls, wireless switches, remote controlled fireplaces, garage doors and even appliances. The decreases in price and increased availability have made home audio, home video, and home automation electronics more available to end users.

The availability of home automation devices, large screen TVs, surround sound stereo equipment, DVDs, CDs, MP3s and similar electronic equipment has also increased consumer interest in networking such devices together. It has become easier and less expensive to buy many networkable components that can be used to control lighting, monitor appliances, access environmental controls, and provide high quality audio-visual entertainment through broadcast television, satellite programs, cable programs, and internet connections for a home automation network.

The increasing availability of wireless networks has enabled a wide variety of devices to be centrally controlled through the use of wireless home automation networks. Wireless networks have enabled home automation components to be attached and installed into existing infrastructure. The wireless networks have also reduced the cost of expensive wiring. However, even with the ever increasing availability of wireless networks, home automation is still only installed in limited numbers. One reason for the limited use of home automation networks is the inherent complexity of controlling a large number of devices. Wireless networks can add to the complexity when various types of interference reduce the ability to command and control automated devices from a single location.

DETAILED DESCRIPTION

Figure 1:
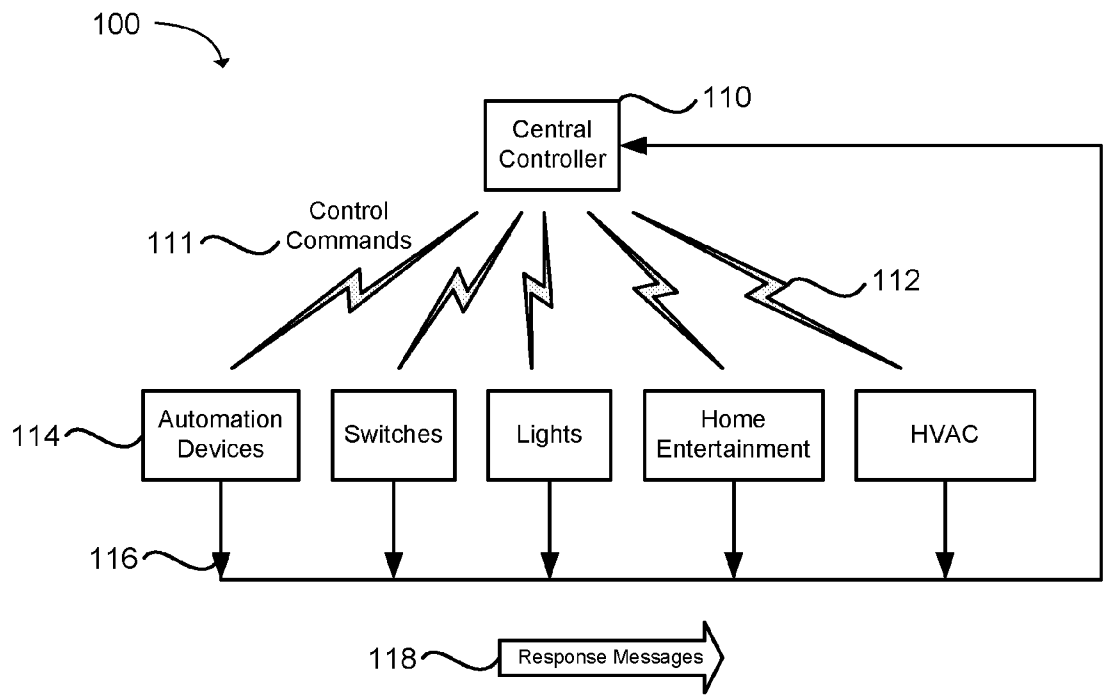
FIG. 1 is a block diagram illustrating an embodiment of a system configured to send less important traffic over a wired communication channel in an automation network.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

When building automation and control systems, one important element of the system is the electronic communication network that connects the devices together. A communication network in a control system provides the communication channels that allow the control system to manage connected devices.

The communication network is used for: configuration of devices in communication through the network, sending commands to the disparate devices, and receiving status information from the devices. In most cases, sending commands is more important than receiving status and other information from the devices. In some cases, where there are many commands that need to be sent at the same time, the status information can interfere with efficiently sending out the commands.

An embodiment of a system and method are described herein for a secondary network that is added to the control system primarily to communicate response messages and other types of status from the networked devices to the control system or central controller. This embodiment can provide communications redundancy in that the secondary network can carry all of the data traffic in the event of a failure on the wireless network. Thus, a robust automated network system provides the ability for automated devices to communicate with a high probability of success.

FIG. 1 illustrates one embodiment that includes a control device or central controller 110 where the primary network is an RF wireless network 112. Control commands 111 can be sent to automation devices 114 using the RF wireless network. The automation devices can include: remotely controlled light switches and dimmers, network controllers, power controls for electronic equipment, switches and relays for electronic equipment, remote controlled fireplaces, garage doors, appliances, HVAC controllers, fans, telephones, computers, audio visual equipment, and other types of electronic devices that can be controlled remotely.

A secondary wired communication network 116 can also be used that is a Power Line Carrier (PLC) network. The wired communication network can be used to communicate response messages 118 to the central controller over the PLC network. Response messages include data sent from the automation devices to the central controller in response to a command received from the central controller. Response messages can also include messages sent from the automation devices to the central controller to report a change that has occurred in the status or health of the reporting devices. Response messages can further include other types of status or health information transmitted intermittently from the automation devices to the central controller.

Use of a wired network 116 can enable the bandwidth of the wireless network to be used primarily for transmissions from the controller to the automated devices. In one embodiment, hardware costs can be reduced for the wireless network by using only unidirectional wireless links. For example, the central controller 110 can include only a wireless transmitter. The automation devices 114 can include only a wireless receiver configured to receive data from the transmitter in the central controller. The automation devices can also include a wired transmitter or transceiver configured to communicate over the wired network, such as the PLC network. When the automation devices receive control command data or other signals over the wireless network from the central controller they can respond via the wired network.

In another embodiment, the wired network 116 can also provide communications redundancy. For example, if the central controller 110 transmits a command 111 to one of the automated devices 114 via the wireless network 112 and fails to receive a response back from the device, the command can be repeated over the wired network. Thus, the wired network reduces the cost of the wireless network between the central controller and the automation devices and can also act as a redundant backup.

The wired network 116 can reduce or eliminate failures of the central controller to communicate with the automation devices due to radio frequency interference. Radio frequency interference that obstructs communication in a wireless network can often occur in the enclosed area such as a home or business. For example, a wide variety of different types of radio frequency signals are transmitted in the enclosed area, such as cellular phones, wireless phones, analog and digital signals for radio and television, wireless internet, WiMAX signals, sixty hertz signals from power lines, and signals from neighboring houses and buildings. Many of these signals can cause interference with other wireless networks, such as the wireless network 112. Additionally, movement of people and objects such as furniture within a room or building can result in interference between wireless links due to shielding between the transmitter and receiver caused by the objects and people.

Radio frequency interference between the central controller 110 and the automation devices 114 caused by interfering signals and shielding can result in occasional losses of the control commands 111 sent from the central controller to one or more of the automation devices. The regularity of the losses can depend on the physical setup of the system, the frequency band and modulation type used in the data link, the types of interfering signals present, and so forth. Radio frequency links are typically designed to provide a robust system that can successfully transmit and receive a signal. However, when wireless links are included in products that will be installed in a wide variety of different types of locations and environments, it can be difficult to ensure that the wireless links will always work. Therefore, the addition of the wired network 116 can ensure that a home automation system network 100 will have a high probability of working.

As previously stated, the network can typically be used for the transmission of response messages from the automation devices 114 back to the central controller 110. The response messages can include data such as status messages, health messages, and other types of operational messages. When a control command 111 is sent from the central controller 110 to an automation device 114, the automation device can respond with a status message. In one embodiment, the control command can be transmitted via the wireless network 112. The central controller can wait for a predetermined amount of time to receive a status message from the automation device via the wired network 116 that verifies that the command was received and performed. For example, a command can be sent via the central controller to a light source configured to be controlled remotely. The command can be sent to turn the light source on. The command can be received at the light source and the light source can be activated. A response message 118 can then be sent from the light source acknowledging that the command was received and/or performed.

If a response message 118 is not received at the central controller 110 within a predetermined amount of time, the central controller can either retransmit the command over the wireless network 112 or transmit the command via the wired network 116 to one or more of the plurality of automation devices. The command can then be received and a response message 118 transmitted back to the central controller via the wired network 116.

The automation devices 114 may also send messages without first receiving a command. For example, when an automated light is manually activated to alter the status of the light (turning it on or off), a response message 118 can be transmitted from the automated light to the central controller 110 to keep an accurate, up to date status of all of the automated devices at the controller. Various types of messages may also be sent regarding the health of the automated devices. The devices can be programmed to transmit their health status over the wired network 116 at a predetermined frequency, such as once an hour, once a day, once a week, or whatever frequency is desired for a specific automated device. The health status message may be as simple as a single bit transmitted that represents a device is operating within defined parameters. Alternatively, the health message may involve a variety of information regarding the components and operations of the device. The use of the wired network enables the health status message to be transmitted by the automation devices and received at the central controller with a high degree of confidence and without a complex acknowledgement scheme required to be implemented for the transmission of each message, as is typically needed in wireless communications.

The use of the wired network 116 can also enable response messages to be transmitted more frequently than they typically would via a wireless network. For example, one of the automation devices 114 may be an alarm system. When the alarm system is activated it can be configured to send frequent response messages, such as once every second, to the central controller regarding the operational functionality of the alarm and its various components. If the alarm system is somehow altered or deactivated in an inappropriate manner, the status and health of the alarm system and its components can be quickly reported to the central controller 110. The central controller can be configured to take an appropriate action based on the status message received from the alarm system.

Alternatively, the central controller 110 can be configured to expect to receive a message from the alarm system at a predefined frequency, such as once per second. This message is referred to as a proactive operational message (POM). If the alarm system is inappropriately deactivated, such as having the power cut to the house or building, the central controller can be configured to report the loss of the POM signal from the alarm system. Such a system may not be capable of being implemented without the use of the backup wired network 116. A purely wireless system may not be sufficiently reliable to enable the central controller 110 to be configured to expect a POM signal to be received at a fairly high frequency and report an alarm condition if the message is not received. As previously discussed, radio frequency interference and unintended shielding can cause messages to be lost on occasion, thereby potentially creating a false alarm each time the wireless signal is not received. The use of the wired network to transmit POM messages can enable the frequent, reliable transmission and reception of messages that allow the central controller to be used to ensure the substantially continuous proper operation of critical automation devices, such as the security alarm.

While the wired network 116 can enable redundant communication with a high degree of likelihood that a message will be received, the wired network can also have limitations. Various types of automation devices may not be configured to be continuously connected to the internal power line wiring in a home or business. For example, a battery powered device such as a portable computing device can be configured to be part of the automated network. One type of battery powered portable computing device is a wireless touch screen. The wireless touch screen can be used to wirelessly receive commands from the central controller 110. In such instances, the wireless network 112 can be used to transmit commands from the central controller 110 to the battery operated device, such as the wireless touch screen. When the battery operated device is plugged in to recharge, the device can be configured to transmit status messages, health signals, and other desired communication via the power line carrier network to the central controller. Alternatively, a battery operated device such as the wireless touch screen may be configured to wirelessly communicate with a base station. The base station can be connected to a power line, thereby enabling the battery operated device to send status signals to the base station, which can then communicate those signals over the wired network to the central controller, allowing the central controller to know the health and status of the battery operated device.

The wired network 116 is not limited to a power line carrier network. Various types of automation devices, such as home entertainment equipment, may also be configured to be connected to other existing wired networks, such as phone lines, computer networking and Ethernet cables like a category five (Cat 5) type cable, coaxial cables, and the like. The central controller 110 can be configured to be connected to a number of different types of wired and wireless systems to enable the controller to communicate with a wide variety of different types of automation devices.

Figure 2:
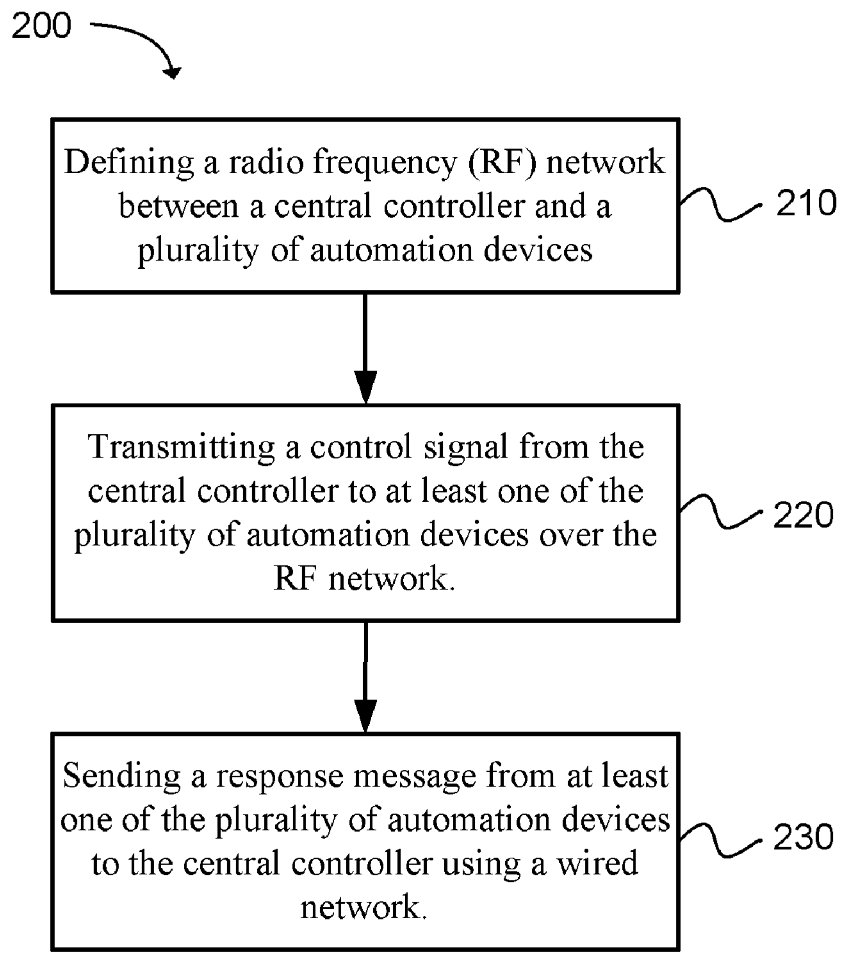
FIG. 2 is a flowchart illustrating an embodiment of a method of a response message over a wired communication channel in an automation network.

Another embodiment of the present invention provides a method 200 of sending a response message over a communication channel in an automation network, as illustrated in the flow chart shown in FIG. 2. The method includes the operation of defining 210 a radio frequency (RF) network between a central controller and a plurality of automation devices. A control signal is transmitted 220 from the central controller to at least one of the plurality of automation devices over the RF network. A response message is sent 230 from at least one of the plurality of automation devices to the central controller using a wired network. In one embodiment, a plurality of different controllers may be used to transmit control commands to the automated devices in the home automation network. Each of the controllers may be coupled to the wired network to enable the controllers to receive the response signals from the automated devices via the wired network.

It is to be understood that the above-referenced arrangements are only illustrative of the application for the principles of the present invention. Numerous modifications and alternative arrangements can be devised without departing from the spirit and scope of the present invention. While the term home automation is used herein, these electronic components that have been described can be used with the central controller in other settings, including business, education, government, hotels, churches, broadcasting and entertainment facilities. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A system of sending response messages over a wired communication channel in an automation network, comprising:

a plurality of automation devices;

a central controller configured to transmit control signals to the automation devices using a radio frequency (RF) network, wherein the central controller waits for a response message from at least one of the plurality of automation devices to be received at the central controller using a wired network; and the wired network being in communication with the central controller and the plurality of automation devices, wherein the plurality of automation devices are configured to send the response messages to the central controller using the wired network, wherein the central controller retransmits the control signal from the central controller to at least one of the plurality of automation devices over the wired network if the response message is not received at the at least one automation device within a predetermined period after the control signal is transmitted over the RF network.

2. A system as in claim 1, wherein the wired network is a power line carrier network.

3. A system as in claim 2, wherein the power line carrier network includes a transmitter in each of the plurality of automation devices configured to be connected to a power line, and wherein the transmitter is configured to transmit the response messages over the power line carrier network.

4. A system as in claim 1, wherein the wired network is an Ethernet network.

5. A system as in claim 1, wherein the radio frequency network includes a wireless transmitter for transmitting the control signals to the automation devices.

6. A system as in claim 1, wherein the response messages are status messages from the automation devices.

7. A system as in claim 6, wherein the response messages are proactive operational messages configured to enable the central controller to ensure a substantially continuous proper operation of an automation device.

8. A system as in claim 1, wherein the response messages are acknowledgement messages from the automation devices.

9. A system as in claim 1, further comprising a base station configured to wirelessly communicate with a battery powered device, wherein the base station is coupled to the wired network to enable the base station to send the response messages to the central controller using the wired network.

10. A method of sending a response message over a wired communication channel in an automation network, comprising:

defining a radio frequency (RF) network between a central controller and a plurality of automation devices;

transmitting a control signal from the central controller to at least one of the plurality of automation devices over the RF network;

waiting for a response message from at least one of the plurality of automation devices to be received at the central controller using the wired network;

retransmitting the control signal from the central controller to at least one of the plurality of automation devices over the wired network if the response message is not received at the at least one automation device within a predetermined period after the control signal is transmitted over the RF network; and sending the response message from at least one of the plurality of automation devices to the central controller using a wired network.

11. A method as in claim 10, wherein the step of sending the response message further comprises the step of sending the response message over a power line carrier network to the central controller.

12. A method as in claim 10, wherein the step of sending the response message further comprises the step of sending the response message over an Ethernet network to the central controller.

13. A method as in claim 10, wherein the step of sending the response message further comprises the step of sending a status message over the wired network to the central controller.

14. A method as in claim 10, wherein the step of sending the response message further comprises the step of sending a proactive operational message over the wired network at a predefined frequency.

15. A method as in claim 14, wherein the step of sending the proactive operational message further comprises sending the proactive operational message at a frequency of at least one message per second.

16. A method as in claim 10, further comprising the step of sending the response message to the central controller from the at least one of the plurality of automation devices using the wired network when the at least one automation device is manually altered to enable the central controller to have an accurate status of the at least one automation device.

17. A method as in claim 10, further comprising the step of sending a health status message to the central controller from the at least one of the plurality of automation devices using the wired network, wherein the health message is sent repeatedly at a predetermined rate.

18. A method as in claim 10, further comprising the step of providing a battery operated automation device in wireless communication with the central controller and a base station configured to wirelessly communicate with the battery operated automation device and send the response messages to the central controller using the wired network.

19. A method as in claim 10, wherein the step of sending a response message from at least one of the plurality of automation devices to the central controller using the wired network further comprises sending the response message to a plurality of controllers using the wired network.

* * * * *